United States Patent Office 2,999,008
Patented Sept. 5, 1961

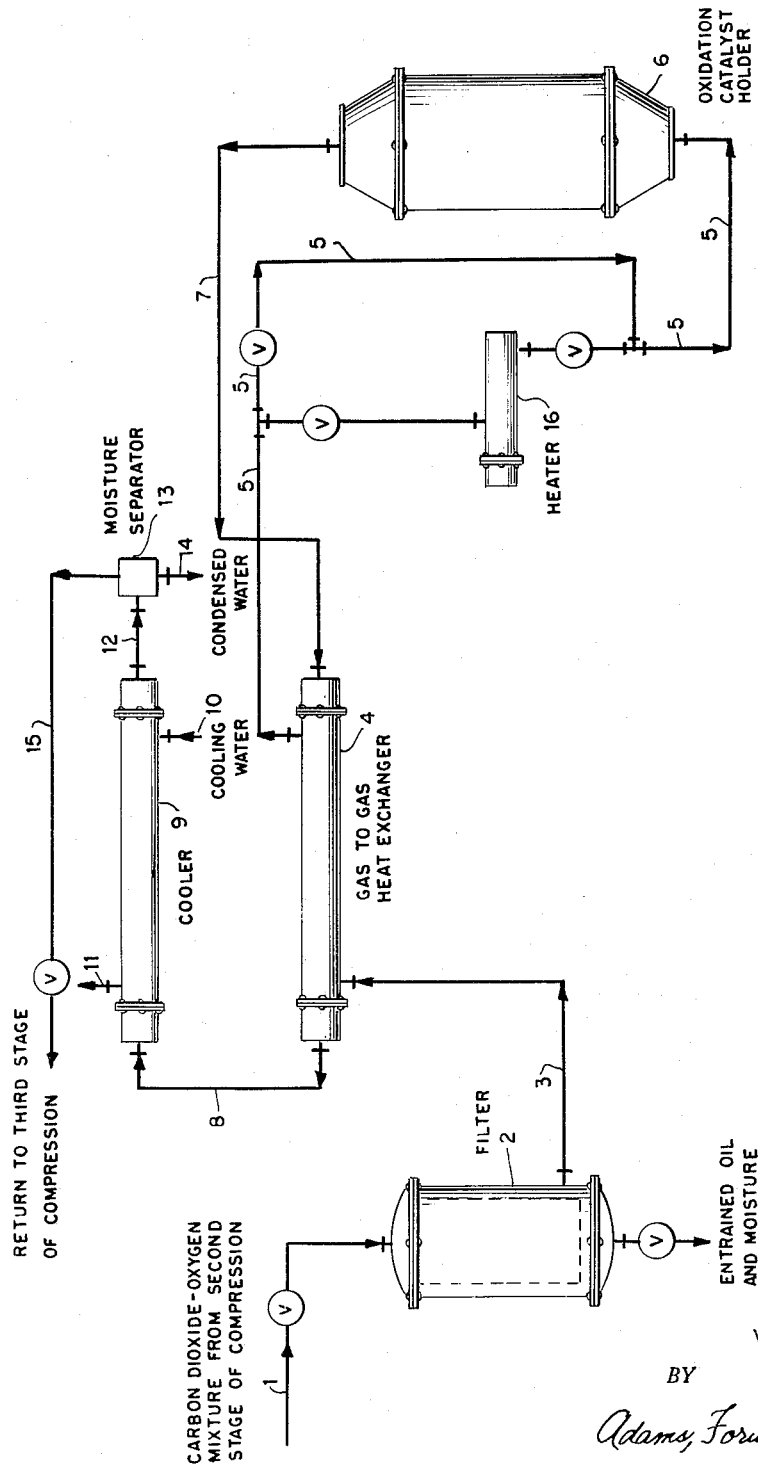

2,999,008
PURIFICATION OF CARBON DIOXIDE FOR UREA SYNTHESIS
Vincent B. Diebold, Cincinnati, Ohio, assignor to Vulcan-Cincinnati, Inc., Cincinnati, Ohio, a corporation of Ohio
Filed Mar. 20, 1957, Ser. No. 647,399
4 Claims. (Cl. 23—150)

This invention relates to an improvement in the manufacture of urea by the reaction of ammonia and carbon dioxide, and has particular reference to the carbon dioxide supplied to the process.

It is known in the art to manufacture urea by reacting ammonia and carbon dioxide under elevated conditions of temperature and pressure. A reaction temperature of the order of approximately 200° C. and a reaction pressure of approximately 1500 p.s.i.g. to 6000 p.s.i.g. can be used, although other conditions of temperature and pressure are applicable. Excess ammonia and carbon dioxide passing through the reactor unchanged can be either discarded or recycled to the process. The carbon dioxide feed can be prepared by the oxidation of carbonaceous materials, such as coke, coal and substances which are essentially hydrocarbon in nature, such as oil and natural gas and other light hydrocarbons, to provide a gaseous stream from which the carbon dioxide is recovered in known manner by the use of conventional absorbents, such as aqueous sodium carbonate, aqueous potassium carbonate, monoethanolamine, triethanolamine and so forth. One advantageous method of manufacturing carbon dioxide involves reacting steam and a light hydrocarbon such as propane in the presence of a catalyst such as supported nickel at a temperature of approximately 1400° F. to 1800° F. to provide a gaseous mixture composed largely of hydrogen, carbon monoxide, carbon dioxide and excess steam, cooling the reaction mixture to approximately 700° F. or 800° F. by mixing it with a further amount of steam, and then passing the reaction mixture into contact with an iron oxide catalyst promoted with chromium oxide whereby the carbon monoxide and steam react to form additional amounts of carbon dioxide and hydrogen. The carbon dioxide can be recovered from the reaction mixture thus produced by the use of one of the conventional absorbents previously mentioned.

In the known process for the synthesis of urea from carbon dioxide derived by the oxidation of carbonaceous materials and ammonia, considerable corrosion is encountered not only from the carbon dioxide and ammonia, but particularly from the small amounts of impurities associated with the carbon dioxide and ammonia, particularly the carbon dioxide. Many attempts have been made to overcome the corrosion by adding materials such as copper salts in the reactor or by the use of special materials of construction, such as lead, silver and stainless steel alloys. The stainless steel alloys are economic and structurally satisfactory, but are themselves subject to attack, particularly if the protective oxide film on the alloys is removed by reducing substances which are present in the carbon dioxide feed.

In accordance with the present invention, the corrosion caused by the presence of reducing substances, namely, hydrogen, carbon monoxide and methane, in the carbon dioxide feed is alleviated by oxidizing them with molecular oxygen in the form of air, oxygen-enriched air or pure oxygen before the carbon dioxide is introduced into the urea synthesis reactor. Thus, the oxidation of the impurities is carried out separately from the urea synthesis reactor. The oxidation of the impurities cannot be satisfactorily carried out by injecting the molecular oxygen directly into the synthesis reactor.

The oxidation step can be carried out at any convenient stage of handling of the carbon dioxide feed prior to the introduction of the carbon dioxide into the synthesis reactor, ranging from atmospheric pressure up to the synthesis pressure. However, the oxidation is carried out most conveniently at some intermediate pressure, such as between the second and third stage of compression of the carbon dioxide in a commercial compressor which is compressing the gases from substantially atmospheric pressure to the synthesis pressure. As a general rule, it is preferred to conduct the oxidation at a pressure of approximately 100 p.s.i.g. to 300 p.s.i.g.

The amount of molecular oxygen admixed with the carbon dioxide to oxidize the impurities present therein depends upon the amount of the impurities and their nature. The impurities are essentially hydrogen, carbon monoxide, and methane, and one or more of them can be present in the carbon dioxide. Hydrogen is the impurity which is generally present in the greatest amount, but it will generally not be present in amount exceeding 2 or 3 percent by volume, based upon the volume of the carbon dioxide. Carbon monoxide and methane will generally be present in much smaller amount, usually up to about 0.25 percent by volume, based upon the volume of the carbon dioxide. In carrying out the process of this invention, it is preferred to admix the molecular oxygen with the feed stream in the amount necessary to convert any hydrogen present to water, any carbon monoxide present to carbon dioxide and any methane present to carbon dioxide and water. Hence, for each mole of hydrogen present in the carbon dioxide it is preferred to add ½ mole of oxygen, for each mole of carbon monoxide it is preferred to add ½ mole of oxygen and for each mole of methane it is preferred to add 2 moles of oxygen. Somewhat larger and smaller amounts of molecular oxygen can also be added, say from 0.5 to 2.0 times these amounts.

The impurities and free oxygen are reacted by passing them while in admixture with each other and with the carbon dioxide into contact with an oxidation catalyst. Conventional oxidation catalysts can be used, and catalysts containing platinum-group metals, such as platinum, rhodium and palladium, are very effective. Other conventional oxidation catalysts can also be used, among them being mixtures of cobaltic oxide and ferric oxide; mixtures of cobaltic oxide and manganese dioxide; mixtures of ferric oxide and alumina; nickel oxide; mixtures of nickel oxide and manganese dioxide; mixtures of nickel oxide and one or more of the oxides of iron, copper, aluminum and chromium; iron chromite; nickel chromite; cobalt chromite; silver oxide; vanadium pentoxide; and molybdic oxide. To accomplish the oxidation of the impurities, the gaseous stream is preheated to a temperature in the range of approximately 225° F. to 700° F. in order to insure satisfactory operation. The preheating can be done by exchanging heat with effluent catalytic reactor gas which has become more elevated in temperature as a result of the exothermic heat of the oxidation reaction. Any auxiliary heat required to heat the carbon dioxide stream prior to contacting the catalyst can be supplied by means of high temperature fluid, an electric heater or other conventional heating means.

After the oxidation of the impurities has been carried out, by passage of the carbon dioxide stream over the oxidation catalyst, the carbon dioxide stream is then suitable for introduction directly into the urea synthesis reactor. The operation can be carried out in this manner when the oxidation is effected after the last stage of compression of the gas. However, it is preferred, after the oxidation has been effected, to cool the gaseous stream and thereby condense water from the stream before introduction into the urea synthesis system. This is conveniently done where the oxidation is carried out at an intermediate pressure, it being conventional to cool a gaseous stream between compression stages in order to minimize the work required for the compression. Where cooling is restored to after the oxidation is carried out, the carbon dioxide stream will generally be cooled to a temperature within the range from about 40° F. to 150° F., the temperature to which the gas is cooled in practice depending upon the temperature of the cooling water available. After cooling and separation of water, the carbon dioxide stream can then be further compressed and heated, as needed, and passed to the synthesis reactor.

The following example illustrates an embodiment which falls within the scope of this invention and further illustrates the practice thereof.

*Example*

This example is to be taken in conjunction with the accompanying drawing.

In the conventional manner, a carbon dioxide stream is manufactured by reacting steam and natural gas over a nickel-alumina catalyst at an elevated temperature of pproximately 1700° F., cooling the reaction mixture to approximately 750° F. by adding diluent steam, passing the reaction mixture into contact with an iron oxide catalyst promoted with chromium oxide, and then recovering the carbon dioxide by the use of monoethanolamine. The carbon dioxide stream thus produced flows at the rate of 15,080 pounds per hour and has the following analysis by volume:

| | |
|---|---|
| Carbon dioxide | 98.96% by volume. |
| Hydrogen | .82% by volume. |
| Nitrogen | .18% by volume. |
| Argon | .01% by volume. |
| Methane | .01% by volume. |
| Carbon monoxide | .02% by volume. |
| Sulfur | Less than 1 p.p.m. |

The carbon dioxide stream, together with 210 pounds per hour of air, is fed to the first stage of a compressor and therein compressed in two stages to a pressure of 200 p.s.i.g. The gas then flows through line 1 of the drawing and, after passing through filter 2 to remove any entrained oil, passes by means of line 3 into gas heat exchanger 4, wherein the temperature of the gas is raised to 450° F. Upon leaving heat exchanger 4 the gas passes by means of line 5 into the bottom of the oxidation catalyst holder 6, which contains approximately 4 ounces of platinum deposited on approximately 14 pounds of alloy steel carrier ribbon or wire, the whole being arranged in the form of a loosely compacted mat. In passing through the oxidation catalyst holder, substantially all of the hydrogen, methane, and carbon monoxide are oxidized. The exothermic heat of reaction raises the temperature of the gas leaving the oxidation catalyst holder to approximately 500° F. By means of line 7 the gas passes into gas heat exchanger 4 and from thence by means of line 8 into cooler 9 which is supplied with cooling water by means of lines 10 and 11. In cooler 9 the temperature of the gas is reduced to 100° F., and by means of line 12 the gas passes to moisture separator 13, from which condensed water is removed by means of line 14. The purified gas leaves the moisture separator and by means of line 15 is passed to the third stage of the compressor. Electric heater 16 is provided for start-up.

Using the system just described, a urea product has been produced containing less than 1 p.p.m. iron and on the average 0.5 p.p.m. iron. In order to determine the value of the catalytic oxidation system, the system was taken out of operation and the carbon dioxide feed gas was by-passed directly back into the succeeding stages of compression. No other changes in operating conditions were made. The iron content of the urea product rose above 2 p.p.m. The catalytic oxidation system was put back into operation and the iron content of the urea product dropped back to 0.5 p.p.m.

What is claimed is:

1. In a process of purifying substantially pure, gaseous, carbon dioxide containing hydrogen, carbon monoxide and methane as contaminants to obtain a pure carbon dioxide especially suitable for the production of urea from carbon dioxide and ammonia, the step of passing the impure carbon dioxide in admixture with molecular oxygen into contact with a catalyst of a metal selected from the group consisting of platinum, rhodium and palladium at a pressure within the range from 100 p.s.i.g. to 300 p.s.i.g. and at an initial temperature within the range from 225° F. to 700° F. whereby the impurities are oxidized, cooling the reaction mixture to a temperature within the range from 40° F. to 150° F. to condense water and separating water therefrom, the amount of molecular oxygen admixed with the impure carbon dioxide being from 0.5 to 2.0 times that stoichiometrically required to convert the hydrogen to water, the carbon monoxide to carbon dioxide and the methane to carbon dioxide and water.

2. The method of claim 1 wherein the amount of oxygen in admixture with the carbon dioxide is that stoichiometrically required to convert the hydrogen to water, the carbon monoxide to carbon dioxide and the methane to carbon dioxide and water.

3. In a process of purifying substantially pure, gaseous, carbon dioxide containing hydrogen, carbon monoxide and methane as contaminants to obtain a pure carbon dioxide especially suitable for the production of urea from carbon dioxide and ammonia, the step of passing the impure carbon dioxide in admixture with molecular oxygen into contact with platinum metal catalyst at a pressure within the range from 100 p.s.i.g. to 300 p.s.i.g. and at an initial temperature within the range from 225° F. to 700° F. whereby the impurities are oxidized, cooling the reaction mixture to a temperature within the range from 40° F. to 150° F. to condense water and separating water therefrom, the amount of molecular oxygen admixed with the impure carbon dioxide being from 0.5 to 2.0 times that stoichiometrically required to convert the hydrogen to water, the carbon monoxide to carbon dioxide and the methane to carbon dioxide and water.

4. The method of claim 3 wherein the amount of oxygen in admixture with the carbon dioxide is that stoichiometrically required to convert the hydrogen to water, the carbon monoxide to carbon dioxide and the methane to carbon dioxide and water.

References Cited in the file of this patent

UNITED STATES PATENTS

| | | |
|---|---|---|
| 1,560,297 | Meigs | Nov. 3, 1925 |
| 2,594,269 | Geisel | Apr. 22, 1952 |
| 2,665,972 | Lewis et al. | Jan. 12, 1954 |
| 2,680,766 | De Ropp | June 8, 1954 |
| 2,690,425 | Moses et al. | Sept. 28, 1954 |
| 2,727,069 | Van Waes | Dec. 13, 1955 |
| 2,756,121 | Grimes | July 24, 1956 |